United States Patent
Goyal et al.

(10) Patent No.: US 10,997,604 B2
(45) Date of Patent: May 4, 2021

(54) PREDICTIVE MODELING AND ANALYTICS INTEGRATION PLATFORM

(71) Applicant: Zeta Interactive Corp., New York, NY (US)

(72) Inventors: Bharat Goyal, San Jose, CA (US); Pavan Korada, San Mateo, CA (US)

(*) Notice: Subject to any disclaimer, the term of this patent is extended or adjusted under 35 U.S.C. 154(b) by 598 days.

(21) Appl. No.: 15/147,615

(22) Filed: May 5, 2016

(65) Prior Publication Data
US 2016/0328658 A1    Nov. 10, 2016

Related U.S. Application Data

(60) Provisional application No. 62/157,342, filed on May 5, 2015.

(51) Int. Cl.
*G06Q 30/00*    (2012.01)
*G06N 5/04*    (2006.01)

(52) U.S. Cl.
CPC ............. *G06Q 30/00* (2013.01); *G06N 5/04* (2013.01)

(58) Field of Classification Search
CPC ... G06F 3/00; G06F 3/048; G06F 1/00; G06F 7/60; G06F 15/18; G06N 3/02; G06N 3/049; G06N 7/00; G06N 7/005; G06N 99/005; G06N 20/00; G06N 5/04; G05B 13/027; G05B 13/048; G06Q 30/00
See application file for complete search history.

(56) References Cited

U.S. PATENT DOCUMENTS

| | | | |
|---|---|---|---|
| 8,370,279 B1* | 2/2013 | Lin | G06N 99/005 706/12 |
| 8,443,040 B2* | 5/2013 | Schauser | H04L 12/1881 709/204 |
| 2002/0194119 A1* | 12/2002 | Wright | G06Q 20/04 705/38 |
| 2003/0220860 A1* | 11/2003 | Heytens | G06N 5/022 705/35 |
| 2004/0215599 A1* | 10/2004 | Apps | G06N 5/025 |

(Continued)

FOREIGN PATENT DOCUMENTS

| WO | 2016179416 | 11/2016 |
|---|---|---|
| WO | 2016179416 | 11/2017 |

OTHER PUBLICATIONS

"Canadian Application Serial No. 2,984,900, Office Action dated Aug. 23, 2018", 4 pgs.

(Continued)

*Primary Examiner* — Eric Nilsson
(74) *Attorney, Agent, or Firm* — Candice Hebden Osnato; Piers Blewett; Jingyuan Nan

(57) ABSTRACT

Certain embodiments may generally relate to systems and methods for rapidly deploying predictive scoring models on a platform that allows for easy integration. A method may include selecting one or more dynamic models for evaluating a scoring request. The method may also include receiving, at a scoring node, a scoring request from at least one requester. The method may further include separating the scoring request into one or more scoring requests, in which each of the one or more score requests may assigned to each of the selected one or more dynamic models. The method may also include combining results from each of the one or more dynamic models. The method may further include evaluating the combined results. The method may also include providing a response to the scoring request based on the evaluation of the combined results.

15 Claims, 6 Drawing Sheets

(56) References Cited

U.S. PATENT DOCUMENTS

| | | | |
|---|---|---|---|
| 2005/0234753 A1* | 10/2005 | Pinto | G06Q 10/04 700/44 |
| 2005/0234760 A1* | 10/2005 | Pinto | G06Q 30/02 703/2 |
| 2006/0212350 A1 | 9/2006 | Ellis et al. | |
| 2012/0191631 A1* | 7/2012 | Breckenridge | G06N 99/005 706/12 |
| 2012/0197606 A1 | 8/2012 | Ishikawa | |
| 2012/0197608 A1 | 8/2012 | Pinto et al. | |
| 2013/0282906 A1* | 10/2013 | An | G06F 9/5027 709/226 |
| 2014/0149161 A1 | 5/2014 | Hedges et al. | |
| 2014/0278771 A1 | 9/2014 | Rehman et al. | |
| 2015/0026061 A1 | 1/2015 | Siegel et al. | |
| 2015/0026323 A1* | 1/2015 | Peri | H04L 41/5045 709/223 |
| 2015/0142713 A1* | 5/2015 | Gopinathan | G06Q 40/00 706/14 |

OTHER PUBLICATIONS

"European Application Serial No. 16790098.4, Response filed Aug. 31, 2018 to Extended European Search Report dated Feb. 5, 2018", 23 pgs.

"European Application Serial No. 16790098.4, Extended European Search Report dated Feb. 5, 2018", 8 pgs.

"International Application Serial No. PCT/US2016/031030, International Search Report dated Aug. 18, 2016", 3 pgs.

"International Application Serial No. PCT/US2016/031030, Written Opinion dated Aug. 18, 2016", 5 pgs.

"Canadian Application Serial No. 2,984,900, Respopnse filed Sep. 19, 28 to Office Action dated Aug. 23, 2018", 12 pgs.

"International Application Serial No. PCT US2016 031030, International Preliminary Report on Patentability dated Feb. 9, 2018", 17 pgs.

"International Application Serial No. PCT/US2016/031030, Written Opinion dated Sep. 1, 2017", 5 pgs.

"Canadian Application Serial No. 2,984,900, Office Action dated Jan. 11, 2019", 5 pgs.

"Canadian Application Serial No. 2,984,900, Response filed Mar. 4, 2019 to Office Action dated Jan. 11, 2019", 3 pgs.

"International Application Serial No. PCT/US2016/031030, Response filed Mar. 3, 2017 to Written Opinion dated Aug. 18, 2016", 11 pgs.

"European Application Serial No. 16790098.4, Communication pursuant to Article 94(3) EPC dated May 15, 2019", 10 pgs.

"Canadian Application Serial No. 2,984,900, Examiner's Rule 30(2) Requisition dated Oct. 17, 2019", 5 pgs.

"European Application Serial No. 16790098.4, Response filed Sep. 5, 2019 to Communication pursuant to Article 94(3) EPC dated May 15, 2019", 16 pgs.

\* cited by examiner

PREDICTIVE MODELING AND ANALYTICS INTEGRATION PLATFORM

RELATED APPLICATIONS

This application claims priority from U.S. Provisional Patent Application Ser. No. 62/157,342, inventors Bharat et al, entitled "Predictive Modeling And Analytics Integration Platform" filed May 5, 2015, which is incorporated herein by reference in its entirety and made a part hereof.

FIELD OF THE INVENTION

The present invention generally relates to systems and methods for deploying predictive scoring models, and, more specifically, to systems and methods for rapidly deploying predictive scoring models on a platform that allows for easy integration.

BACKGROUND OF THE INVENTION

For-profit education schools often identify prospective students through an array of approaches. The vast majority of prospective students are often sourced from lead generation firms. Schools procure prospect leads from such firms, reach out to leads via their call center and ideally get prospects to enroll in one of their program offerings. Such a process can be very cost-intensive.

The likelihood that a prospective lead will enroll may be indicated by a metric known as lead quality. For example, high quality leads are those that have a high possibility of enrolling, and low quality leads are those that have a low possibility of enrolling. In obtaining leads, schools may have to work within the confines of a fixed prospecting/lead generation budget. They are therefore required to source the highest quality leads that they can within their budget. The lead generation firms that they work with may span the entire gamut of quality, and school marketing departments have to ensure that their budget is deployed across the best possible lead sources. However, it usually takes between 90-120 days to truly know if a prospective lead is going to enroll with a school or not. In other words, the schools cannot know, in real-time, whether the lead they are getting is high quality or not. Low quality leads are those that have a low possibility of enrolling.

Due to the constraints described above, schools may have to rely on their historical experience to ensure that they get leads from the best providers. However, this is fraught with several issues. For example, such leads may be expensive, and lead generators may not be able to maintain consistent lead quality.

Predictive modeling solutions, such as scoring models, that can evaluate in real-time, whether a lead is high-quality, are useful tools that can help schools manage their quality needs within budget. Unfortunately, schools do not have the data-science resources or budget to build and deploy these scoring models.

SUMMARY OF THE INVENTION

Example embodiments of the present subject matter include the following. One embodiment is directed to a method that may include selecting one or more dynamic models for evaluating a scoring request. The method may also include receiving, at a scoring node, a scoring request from at least one requester. The method may further include separating the scoring request into one or more scoring requests, in which each of the one or more score requests may be assigned to each of the selected one or more dynamic models. The method may also include combining results from each of the one or more dynamic models. The method may further include evaluating the combined results. The method may also include providing a response to the scoring request based on the evaluation of the combined results.

In an embodiment, the evaluation may be performed by one or more evaluator nodes. In another embodiment, the method may further include determining a lead quality based on the results from each of the one or more dynamic models. In yet another embodiment, the method may also include retrieving a release of one or more of the dynamic models, and persisting the one or more dynamic models to file modules. According to an embodiment, at least one of the selecting, receiving, separating, combining, evaluating, and providing may be provided on an existing lead-sourcing infrastructure.

Another embodiment is directed to an apparatus, which may include at least one processor, and at least one memory including computer program code. The at least one memory and the computer program code may be configured, with the at least one processor, to cause the apparatus at least to select one or more dynamic models for evaluating a scoring request. The at least one memory and the computer program code may also be configured, with the at least one processor, to cause the apparatus at least to receive, at a scoring node, a scoring request from at least one requester. The at least one memory and the computer program code may further be configured, with the at least one processor, to cause the apparatus at least to separate the scoring request into one or more scoring requests, in which each of the one or more score requests may be assigned to each of the selected one or more dynamic models. The at least one memory and the computer program code may also be configured, with the at least one processor, to cause the apparatus at least to combine results from each of the one or more dynamic models. The at least one memory and the computer program code may further be configured, with the at least one processor, to cause the apparatus at least to evaluate the combined results. The at least one memory and the computer program code may also be configured, with the at least one processor, to cause the apparatus at least to provide a response to the scoring request based on the evaluation of the combined results.

In an embodiment, the evaluation may be performed by one or more evaluator nodes. In another embodiment, the at least one memory and the computer program code may be configured, with the at least one processor, to cause the apparatus at least to determine a lead quality based on the results from each of the one or more dynamic models. In yet another embodiment, the at least one memory and the computer program code may also be configured, with the at least one processor, to cause the apparatus at least to retrieve a release of one or more of the dynamic models, and persisting the one or more dynamic models to file modules. According to an embodiment, at least one of the selecting, receiving, separating, combining, evaluating, and providing may be provided on an existing lead-sourcing infrastructure.

Another embodiment is directed to an apparatus, which may include selecting means for selecting one or more dynamic models for evaluating a scoring request. The apparatus may also include receiving means for receiving, at a scoring node, a scoring request from at least one requester. The apparatus may further include separating means for separating the scoring request into one or more scoring requests, in which each of the one or more score requests may be assigned to each of the selected one or more dynamic models. The apparatus may also include combining means for combining results from each of the one or more dynamic models. The apparatus may further include evaluating means for evaluating the combined results. The apparatus may also include providing means for providing a response to the scoring request based on the evaluation of the combined results.

In an embodiment, the evaluation may be performed by one or more evaluator nodes. In another embodiment, the apparatus may further include determining means for determining a lead quality based on the results from each of the one or more dynamic models. In yet another embodiment, the apparatus may also include retrieving means for retrieving a release of one or more of the dynamic models, and persisting the one or more dynamic models to file modules. According to an embodiment, at least one of the selecting, receiving, separating, combining, evaluating, and providing may be provided on an existing lead-sourcing infrastructure.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE INVENTION

Figure 1:
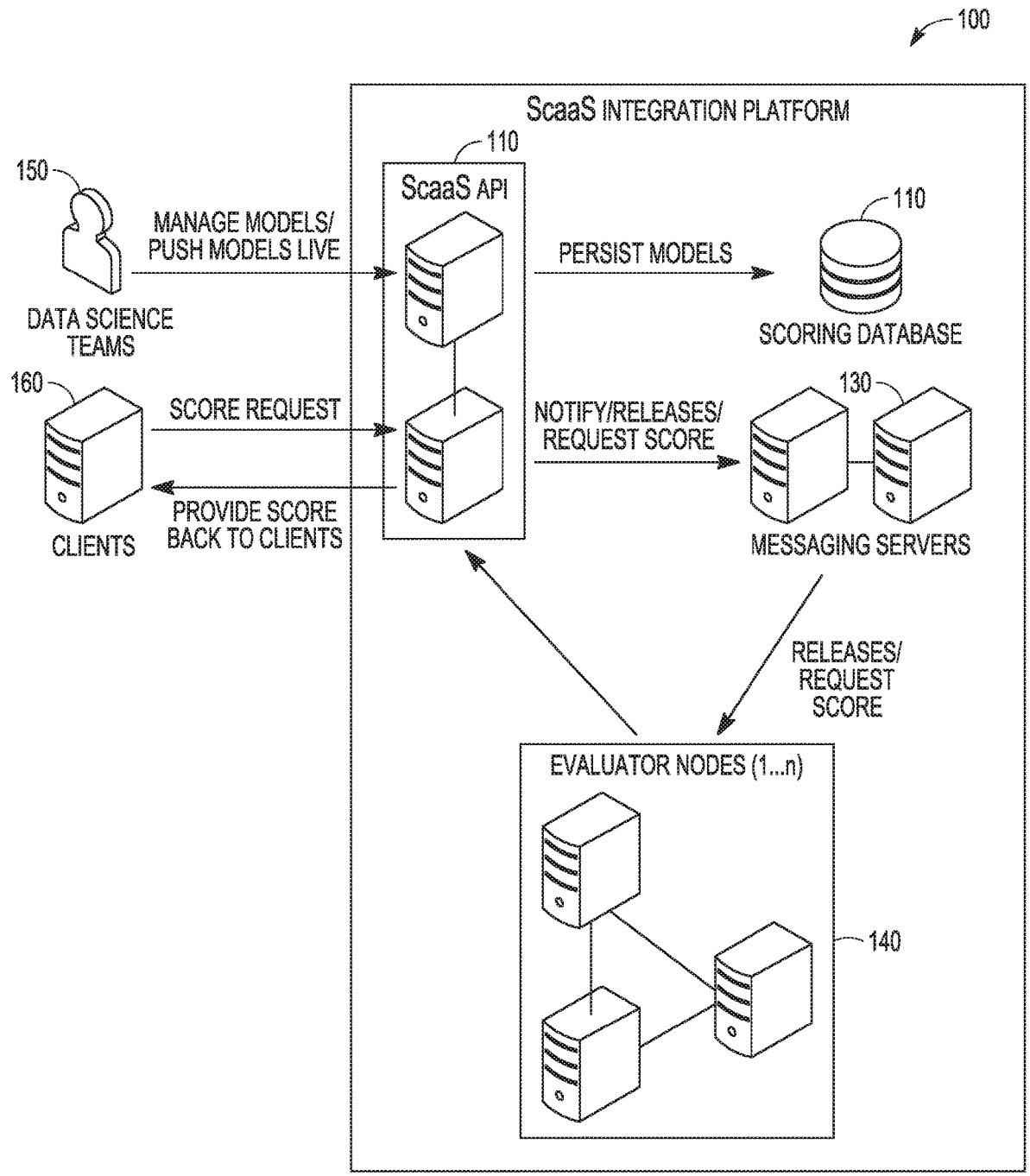
FIG. 1 shows an exemplary high level design of a system, according to one embodiment.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As used herein, a database may be a relational database, flat file database, relational database management system, object database management system, operational database, data warehouse, hyper media database, post-relational database, hybrid database models, RDF database, key value database, XML database, XML store, text file, flat file or other type of database.

Predictive scoring is often considered a major component of lead generation marketing efforts in the for-profit education space. Scoring models are typically built by a data science team and are then deployed on a lead-generation infrastructure. Typically, there is no fast and efficient way to move the model from the build stage to the deployment stage, and integrate a deployed model with an existing lead-generation infrastructure without significant engineering effort and involvement.

The deployment process can be highly complex, requiring significant interaction and resource commitments from engineering and data science teams. The complexity of the process often leads to delays that prevent data-driven insights from being applied in a timely fashion, thereby causing loss of revenue and value.

There may be several options available to schools to maintain its quality objectives. These options may include: (A) build in-house predictive models, and deploy on their lead sourcing infrastructure; or (B) leverage external-scoring models.

Data scientists who build predictive models can be expensive resources. Further, hiring, onboarding and building models take valuable time, time that schools do not have. Additionally, after building the scoring models, there is the time-consuming process of deploying these models on lead sourcing infrastructures. This leaves schools with Option B—leveraging external scoring models. This may be a more viable option but may leave schools with the challenge of how to consume these scoring models. Scoring model vendors may have to work with school engineering teams to integrate their models with the school's infrastructure.

Under both scenarios, embodiments of the present invention enable rapid onboarding of predictive models, and can help schools meet their quality goals within budget. For instance, certain embodiments of the present invention may provide an integration framework that provides an efficient architecture that allows schools to rapidly deploy scoring models onto their lead-sourcing infrastructure with minimal resources. The integration framework here may allow the schools to quickly deploy scoring models in their environment and start utilizing them for making quality decisions based on data generated from the scoring models.

According to certain embodiments, the integration framework is not limited to any one particular model, specific algorithm, domain, or outcome. Instead, the integration framework may be generalizable and applied and adapted to various industries including, but not limited to, for example, telecommunications, finance, in-house systems, travel, entertainment, media, financial services, mid-tier B2C retailers, and lead management systems. Further, the integration framework may be applicable internally for lead scoring purposes, or the integration framework may be customizable for individual needs. Moreover, different types of modeling algorithms may be used with the integration framework.

According to certain embodiments, it may be possible to provide a model scoring as a service (ScaaS) model deploying system. The ScaaS model deploying system may be characterized as an integration engine/platform for deploying and integrating predictive models without any engineering involvement or development. The system may provide a platform which provides ease of deployment and integration. ScaaS may also be used/integrated with third party software and models In an embodiment, the ScaaS model deploying system may provide an analytics and data science integration platform that may provide a clear separation of model build, deployment and integration stages. The platform may also provide a rapid design and build of predictive models, and may allow legacy systems built around hard-wired models to transition to an agile environment where state-of-the-art predictive models can easily be deployed.

Further, in certain embodiments, the platform may allow data-science teams to operate independently without dependencies on engineering systems. Additionally third party users and clients may be able to leverage the platform and rapidly deploy in-house predictive models without the need for dedicated engineering investment or exposing proprietary data.

Although not required, the systems and methods are described in the general context of computer program instructions executed by one or more computing devices that can take the form of a traditional server/desktop/laptop; mobile device such as a smartphone or tablet; etc. Computing devices typically include one or more processors coupled to data storage for computer program modules and data. Key technologies include, but are not limited to, the multi-industry standards of Microsoft and Linux/Unix based Operation Systems; databases such as SQL Server, Oracle, NOSQL, and DB2; Business analytic/Intelligence tools such as SPSS, Cognos, SAS, etc.; development tools such as Java, NET framework (VB.NET, ASP.NET, AJAX.NET, etc.); and other e-Commerce products, computer languages, and development tools. Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

FIG. 1 shows an exemplary high level design of a system, such as a ScaaS integration platform 100, according to an embodiment. The ScaaS integration platform 100 may include a ScaaS application program interface (API) 110, scoring database 120, messaging servers 130, and evaluator nodes 140. Utilization of the ScaaS integration platform 100 may be initiated by a data science team(s) 150 and/or a client(s) 160.

In an embodiment, the ScaaS API 110 may be a restful API for requesting scores using a deployed model, managing accounts for clients (provisioning a new client/account, enabling/disabling an account, viewing all accounts) in a serial attached small computer system interface (SCSI) (SAS) model, and managing scoring models. The managing scoring models may include deploying newer versions of models, and/or viewing deployed models.

The scoring database 120 may contain all setup information (meta data) for ScaaS, including configured accounts of clients, deployed models and their historical versions, deployment history and audit information, and all provisioned user information. Furthermore, the messaging servers 130 may allow for all intra process communication in the platform. For example, the messaging servers 130 may allow components to be decoupled from each other, aid in easy and seamless integration of components, and ensure that the load is evenly balanced across all evaluator nodes. Additionally, messages that flow through the messaging servers 130 may be short lived.

Evaluator nodes 140 may each contain an evaluator component that is used for evaluating a scoring request. A request to score may be for a single scoring model that has been deployed. Evaluator nodes may also be exposed via a restful evaluator-api.

According to an embodiment from the data science team 150, models, such as predictive models/scoring models, may be managed/pushed live or provided to the ScaaS API. The ScaaS API may then persist the models to the scoring database 120 where the models are stored. Scoring database is the central repository of all deployed models.

According to another embodiment, clients 160 may request the scores of leads. Such a request may be sent to the ScaaS API 110, which may send a score request to the messaging servers 130. In response to the request from the ScaaS API 110, the messaging servers 130 may provide the score request to the evaluator nodes. After receiving the score request from the messaging servers 130, the evaluator nodes 140 may evaluate the score request from the client 160, and provide the results of the evaluation to the ScaaS API 110. After receiving the results of the evaluation from the ScaaS API 110, the ScaaS API 110 may return the actual score to the clients 160. Additionally, in an embodiment, all input/output from/to the requestor of the scores may be passed through the ScaaS API 110.

Figure 2:
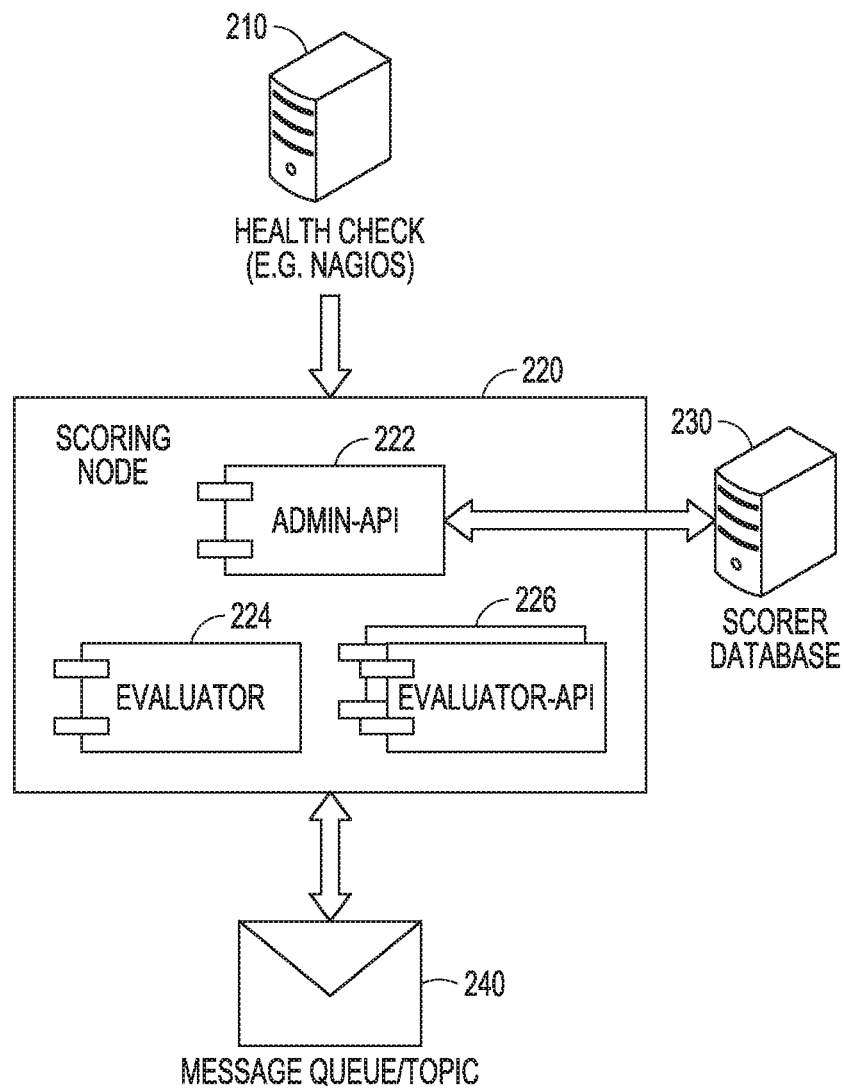
FIG. 2 shows an exemplary deployment topology, according to one embodiment.

FIG. 2 shows an exemplary deployment topology of ScaaS, according to an embodiment. In particular, FIG. 2 shows a health check (nagios) unit 210. The health check unit 210 may, in certain embodiments, be an open source computer system monitoring, system monitoring, network monitoring, and infrastructure monitoring software application. The health check unit 210 may be configured to monitor the operation of a scoring node 220, which is related to the evaluator nodes 140 shown in FIG. 1. For example, each of the evaluator nodes 140 of FIG. 1 may be represented by a single evaluator component in FIG. 2. Further, the ScaaS deployment system may include various web modules, such as those further discussed below. Additionally, in an embodiment, the health check unit 210 may be configured to implement an open source system called Nagios to monitor the health of all of the nodes/servers of the ScaaS deployment system. Monitoring can be done via hypertext transfer protocol (HTTP), which can provide notification in the event of any failures of the nodes/servers. The notifications may be sent via e-mail or pagers, for example.

The health status check 210 may also provide a status page that exposes statistics and a listing of the runtime models (refresh time, etc.). In an embodiment, the statistics may include average/minimum/maximum response times of scoring requests, volume of requests, etc.

As shown in FIG. 2, the scoring node 220 may include one or more modules. For example, the scoring node 220 may include an admin-api 222, evaluator 224, and evaluator-api 226.

According to an embodiment, the admin-api 222 may be a web module that exposes restful API for: (1) organization and account provisioning; (2) model management and releases: and (3) security, including organization and account based security, and role based security. All clients wanting to use ScaaS may need to have an organization and an account provisioned within the system. Once they are provisioned, they may use the API to deploy models, manage the deployments, and have multiple versions/releases of their models. Furthermore, different users may be authorized to perform various tasks by using hierarchical levels of authorization.

In an embodiment, the evaluator 224 may be a web module that is responsible for evaluating a scoring request. The evaluator 224 may also evaluate a request corresponding to a scoring with a single model, such as a scoring model. Further, the evaluator 224 may be responsible for model synchronization between multiple scoring models. Since there are multiple evaluator nodes, model synchronization may be helpful to make sure the same version of the model is deployed and available to all nodes.

In an embodiment, the evaluator-api 226 may be a web module that exposes restful API for scoring requests. The evaluator 226 may also provide support for scoring with multiple models, support for scoring timeouts, and support for aggregators. Timeouts may happen in the event the servers take too long to process a request from the client. Additionally, aggregators may allow a scoring request to utilize multiple models and aggregate the results of each.

The ScaaS deployment topology of FIG. 2 also includes messaging to the scoring node 220 via a message queue/topic 240. According to certain embodiments, all component communications may be done via messaging. This allows components such as evaluator nodes to be decoupled from one another. The messaging also allows for easy integration. For example, adding components by deploying them on new servers may be seamless. The messaging may also ensure load balance on evaluators to ensure and maintain proper operation/performance of the ScaaS system. Additionally, messages communicated via the messaging may be short lived.

The ScaaS deployment topology shown in FIG. 2 further includes a scorer database 230. The scorer database 230 may perform various operations and/or functions. For example, organizations and accounts of clients may be added to the scorer database 230. Additionally, the scorer database 230 may provide support for model persistence and versioning, provide a deployment history of the models, and provide user management of all provisioned users that are authorized to use ScaaS.

In an embodiment, the ScaaS system may also include file models (not shown). In these file models, model releases are persisted locally. Thus, on node restart, there would be no need to retrieve model releases from the admin-api 222.

Figure 3:
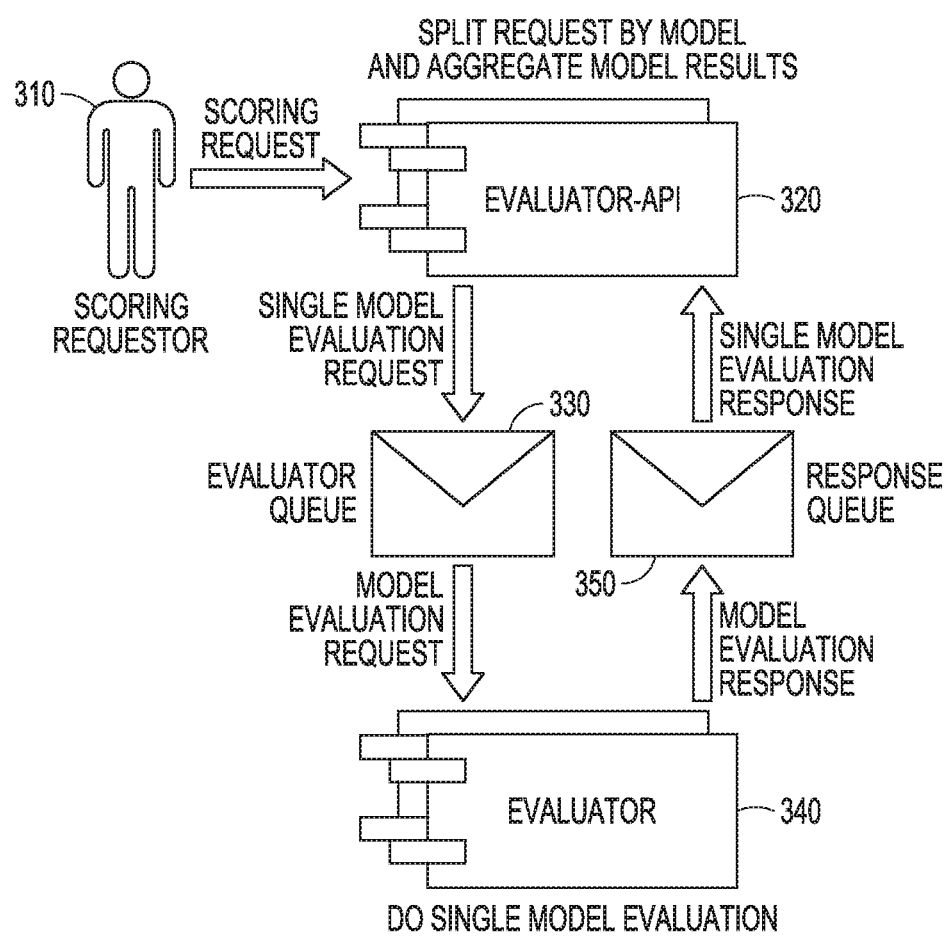
FIG. 3 shows an exemplary scoring request handling flow diagram, according to one embodiment.

FIG. 3 shows an exemplary scoring request handling flow diagram, according to one embodiment. The scoring request handling may begin with a scoring requester 310 sending a scoring request for a score of a lead to an evaluator-api 320. The evaluator-api 320 may split the request by model and aggregate model results. Upon receipt of the scoring request, the evaluator-api 320 may send a single model evaluation request to an evaluator queue 330. The evaluator queue 330 may then send a model evaluation request to the evaluator 340.

The evaluator 340, upon receipt of the model evaluation request, may perform a single model evaluation of the lead. After performing the model evaluation, the evaluator 340 may send a model evaluation response to the response queue 350, which may send a single model evaluation response of the lead to the evaluator-api 320. From the evaluator-api 320, the model evaluation response may be sent to the ScaaS API 110, which may then send the model evaluation response to the scoring requester.

Figure 4:
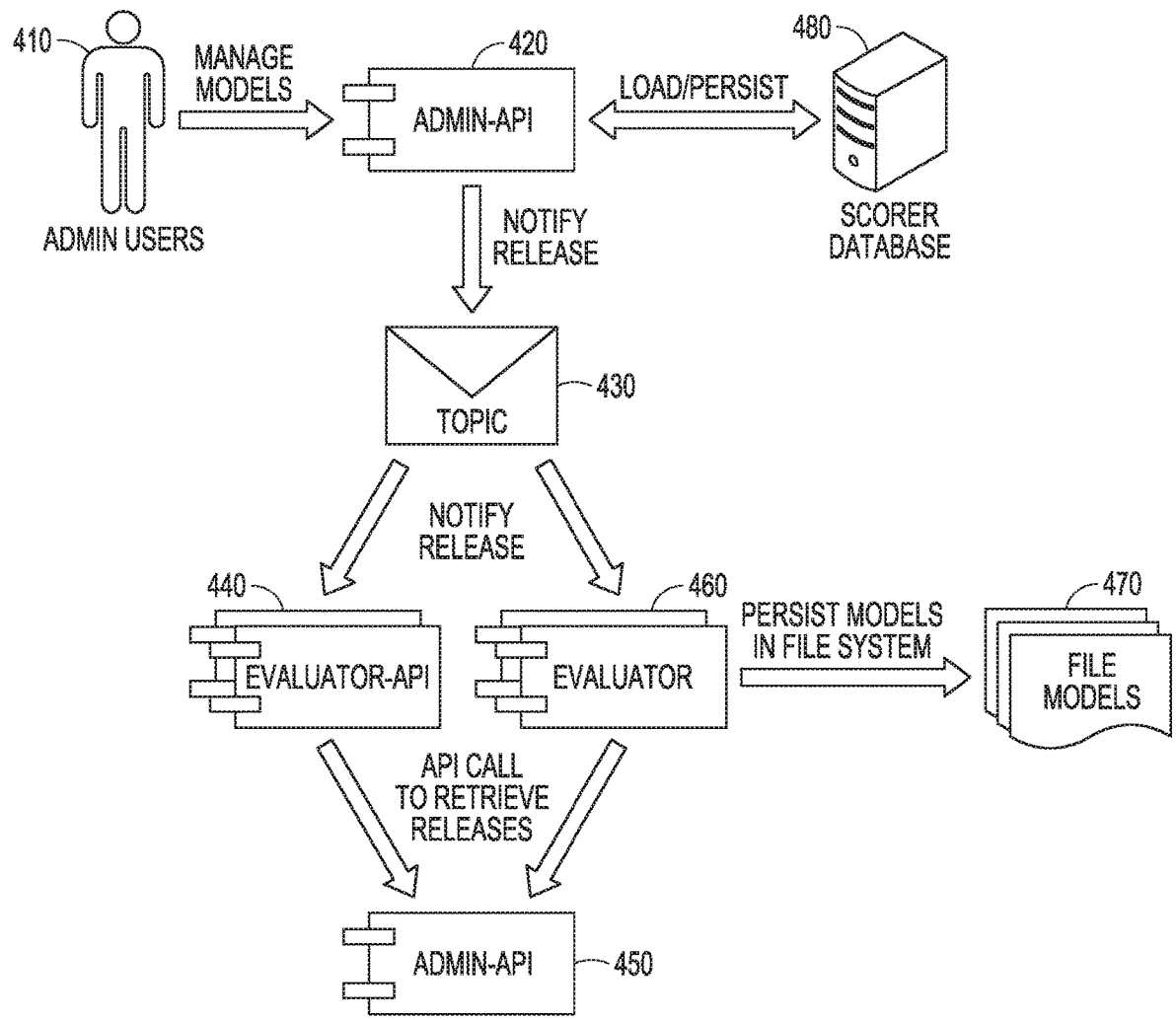
FIG. 4 shows an exemplary model release, according to one embodiment.

FIG. 4 shows an exemplary model release, according to an embodiment. The ScaaS model release may be initiated by admin users 410 that send manage models, such as scoring models, to an admin-api 420. The admin-api 420 may send a notify release to a message topic 430. In response to receiving the notify release from the admin-api 420, the topic 430 may forward the notify release to either an evaluator-api 440, or an evaluator 460. Both the evaluator-api 440 and evaluator 460 may send an API call to retrieve the releases of the scoring models from another admin-api 450. Further, the evaluator 460 may send persist models stored in a file system to file models 470, which store model releases that are persisted locally. Additionally, the admin-api 420 may also exchange load/persist data with a scorer database 480.

Figure 5:
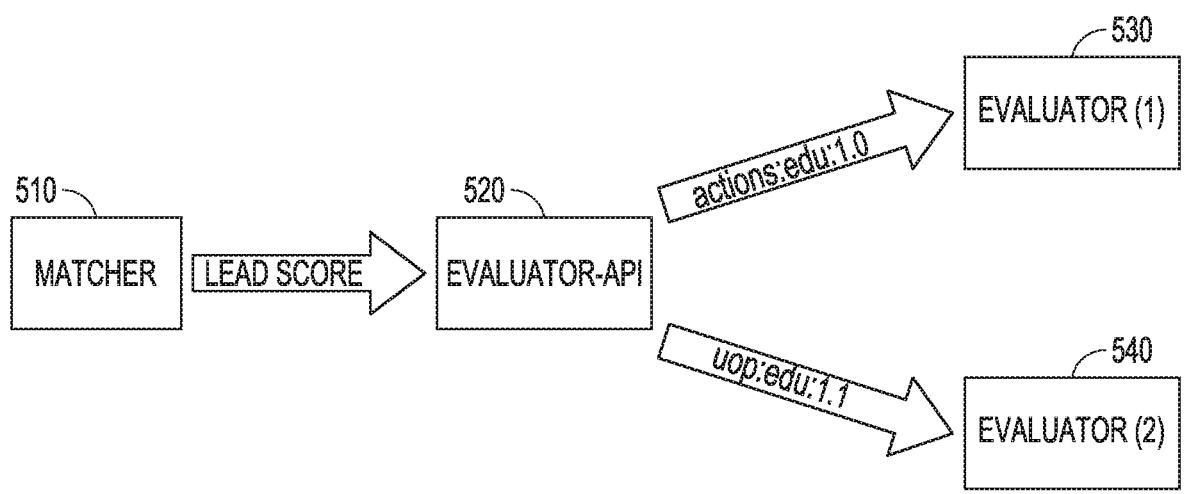
FIG. 5 shows an exemplary flow diagram, according to one embodiment.

FIG. 5 shows an exemplary flow diagram, according to an embodiment. As shown in FIG. 5, a matcher 510 (which may be the client system requesting the score) may send a lead score request to an evaluator-api 520. After receiving the lead score request from the matcher 510, the evaluator-api 520 may deploy one or more scoring models to one or more evaluators. For example, the scoring model(s) may include an actions:edu:1.0 and/or a uop:edu:1.1. One scoring model, such as the actions:edu:1.0 may be sent to a first evaluator 530, while the uop:edu:1.1 may be sent to a second evaluator 540. In other words, in this example, there are two models deployed as part of the model group. Thus, the incoming request may be scored using both of the models.

Figure 6:
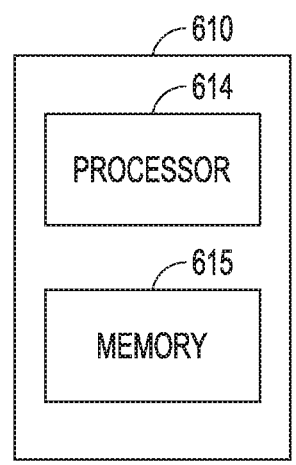
FIG. 6 shows an exemplary system, according to one embodiment.

FIG. 6 illustrates an example of a system according to certain embodiments. In one embodiment, a system may include multiple devices, such as, for example, at least apparatus 610. The apparatus 610 may be a number of devices including, for example, ScaaS API 110, scoring database 120, messaging server 130, evaluator node(s) 140, or the like. Although not shown, the system may include a combination of devices represented by apparatus 610 not limited to those listed above.

Each of the devices representative of the apparatus 610 may include at least one processor 614 for processing information and executing instructions or operation. Processor 614 may be any type of general or specific purpose processor. While a single processor 614 is shown for apparatus 610 in FIG. 6, multiple processors may be utilized in each device according to other embodiments. In fact, processor 614 may include one or more of general-purpose computers, special purpose computers, microprocessors, central processing units (CPU), digital signal processors (DSPs), field-programmable gate arrays (FPGAs), application-specific integrated circuits (ASICs), and processors based on a multi-core processor architecture, as examples, or other comparable devices.

The processor can be implemented as a single controller, or a plurality of controllers or processors. The processor may also perform functions associated with the operation of the system including, without limitation, precoding of antenna gain/phase parameters, encoding and decoding of individual bits forming a communication message, formatting of information, and overall control of the system.

At least one memory (internal or external) can be provided in each device representative of apparatus 610, and indicated as 615. The memory may include computer program instructions or computer code contained therein. The processor 614 and memory 615 can be configured to provide means corresponding to the various blocks and processes shown in FIGS. 2-5.

Memory 615 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processor can be any suitable form of computer program code, for example, a compiled or interpreted computer program written in any suitable programming language.

The memory and the computer program instructions can be configured, with the processor for the particular device, to cause a hardware apparatus such as apparatus 610 to perform any of the processes described herein (see, for example, FIGS. 2-5). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Although FIG. 6 illustrates a system including an apparatus 610 embodiments of the invention may be applicable to other configurations, and configurations involving additional elements. For example, not shown, additional components shown in FIGS. 1-5 may be present.

As mentioned above, according to an embodiment, the system shown in FIG. 6 may include apparatus 610, which may be a number of devices including, for example, ScaaS API 110, scoring database 120, messaging server 130, evaluator node(s) 140, or the like. In an embodiment, apparatus 610 may be controlled by memory 615 and processor 614 to select one or more dynamic models for evaluating a scoring request. The apparatus 610 may also be controlled by memory 615 and processor 614 to receive, at a scoring node, a scoring request from at least one requester. The apparatus 610 may further be controlled by memory 615 and processor 614 to separate the scoring request into one or more scoring requests, wherein each of the one or more score requests is assigned to each of the selected one or more dynamic models. The apparatus 610 may also be controlled by memory 615 and processor 614 to combine results from each of the one or more dynamic models. The apparatus 610 may further be controlled by memory 615 and processor 614 to evaluate the combined results. The apparatus 610 may also be controlled by memory 615 and processor 614 to provide a response to the scoring request based on the evaluation of the combined results.

According to an embodiment, the evaluation may be performed by one or more evaluator nodes. According to another embodiment, the apparatus 610 may further be controlled by memory 615 and processor 614 to determine a lead quality based on the results from each of the one or more dynamic models. According to a further embodiment, the apparatus 610 may also be controlled by memory 615 and processor 614 to retrieve a release of one or more of the dynamic models, and may persist the one or more dynamic models to file modules. In an embodiment, at least one of the selecting, receiving, separating, combining, evaluating, and provided is provided on an existing lead-sourcing infrastructure.

Figure 7:
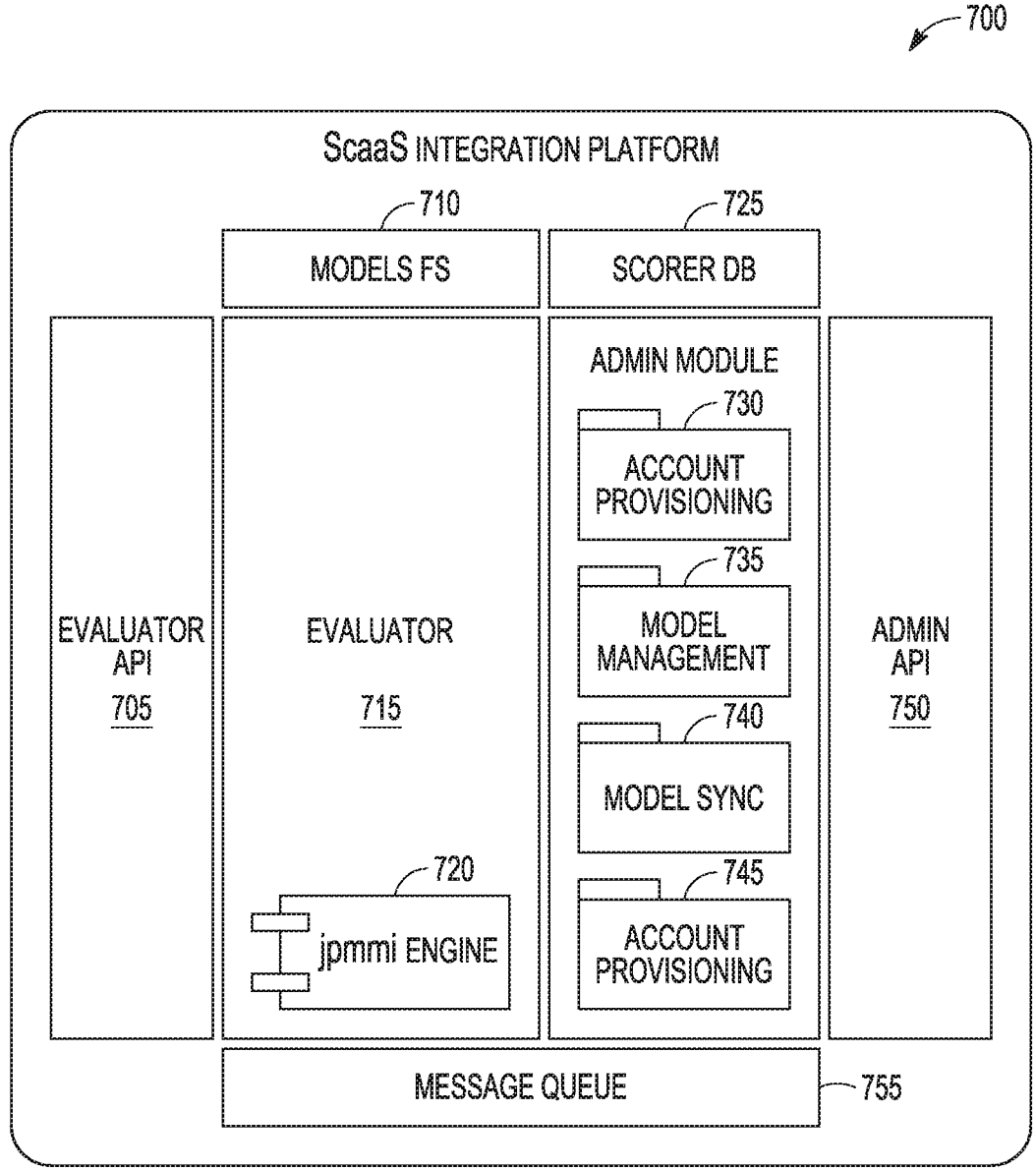
FIG. 7 shows another exemplary system, according to one embodiment.

FIG. 7 illustrates another exemplary system of a ScaaS integration platform 700, according to an embodiment. The ScaaS integration platform 700 may include an evaluator API 705, model FS 710, and evaluator 715. The evaluator 715 may include a JAVA Predictive Model Markup Language (jpmml) engine 720. The ScaaS integration platform 700 may also include a scorer DB 725, an account provisioning unit 730, model management unit 735, model sync unit 740, and account provisioning unit 745. The evaluator 715 may further include an admin API 750 and a message queue 755.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the scope of the invention. In order to determine the metes and bounds of the invention, therefore, reference should be made to the appended claims.

The invention claimed is:

1. A computer implemented method, comprising:
    selecting a plurality of dynamic models for evaluating a scoring request, wherein the dynamic models are stored on a scoring database;
    deploying the dynamic models to each of a plurality of evaluator nodes;
    synchronizing the dynamic models, the synchronizing including at least determining a same version of the dynamic models is deployed and available to all evaluator nodes;
    receiving, at a scoring node associated with one of said evaluator nodes, a scoring request for a score of a lead from at least one requester;
    separating the scoring request into a plurality of scoring requests, wherein each of the scoring requests is assigned to each of the selected dynamic models wherein the request is separated by model and aggregate model results and sent to an evaluator queue;
    combining results from each of the dynamic models;
    evaluating the combined results wherein the evaluator sends a model evaluation response to the response queue; and
    providing a response to the scoring request based on the evaluation of the combined results.

2. The method according to claim 1, wherein the evaluation is performed by the evaluator node.

3. The method according to claim 1, further comprising determining a lead quality based on the results from each of the dynamic models.

4. The method according to claim 1, further comprising retrieving a release of the dynamic models, and persisting the dynamic models to file modules.

5. The method according to claim 1, wherein at least one of the selecting, receiving, separating, combining, evaluating, and providing is provided on an existing lead-sourcing infrastructure.

6. An apparatus, comprising:
    at least one processor; and
    at least one memory including computer program code,
    wherein the at least one memory and the computer program code are configured, with the at least one processor, to cause the apparatus at least to select dynamic models for evaluating a scoring request and wherein the dynamic models are stored on a scoring database;
    deploy the dynamic models to each of a plurality of evaluator nodes;

synchronizing the dynamic models, the synchronizing including at least determining a same version of the dynamic models is deployed and available to all evaluator nodes;

receiving, at a scoring node associated with one of said evaluator nodes, a scoring request for a score of a lead from at least one requester;

separating the scoring request into a plurality of scoring requests, wherein each of the scoring requests is assigned to each of the selected dynamic models wherein the request is separated by model and aggregate model results and sent to an evaluator queue;

combining results from each of the dynamic models;

evaluating the combined results wherein the evaluator sends a model evaluation response to the response queue; and provide a response to the scoring request based on the evaluation of the combined results.

7. The apparatus according to claim 6, wherein the evaluation is performed by the evaluator node.

8. The apparatus according to claim 6, wherein the at least one memory and the computer program code are configured, with the at least one processor, to cause the apparatus at least to determine a lead quality based on the results from each of the dynamic models.

9. The apparatus according to claim 6, wherein the at least one memory and the computer program code are configured, with the at least one processor, to cause the apparatus at least to retrieve a release of the dynamic models, and persisting the dynamic models to file modules.

10. The apparatus according to claim 6, wherein at least one of the selecting, receiving, separating, combining, evaluating, and providing is provided on an existing lead-sourcing infrastructure.

11. An apparatus, comprising:

selecting means for selecting dynamic models for evaluating a scoring request wherein the dynamic models are stored on a scoring database;

deploying means for deploying the dynamic models to each of a plurality of evaluator nodes;

synchronizing means for synchronizing the dynamic models, the synchronizing including at least determining a same version of the dynamic models is deployed and available to all evaluator nodes;

receiving means for receiving, at a scoring node associated with one of said evaluator nodes, a scoring request for a score of a lead from at least one requester;

separating means for separating the scoring request into a plurality of scoring requests, wherein each of the scoring requests is assigned to each of the selected dynamic models wherein the request is separated by model and aggregate model results and sent to an evaluator queue;

combining results from each of the dynamic models; evaluating the combined results wherein the evaluator sends a model evaluation response to the response queue; and providing means for providing a response to the scoring request based on the evaluation of the combined results.

12. The apparatus according to claim 11, wherein the evaluation is performed by the evaluator node.

13. The apparatus according to claim 11, further comprising determining means for determining a lead quality based on the results from each of the dynamic models.

14. The apparatus according to claim 11, further comprising retrieving means for retrieving a release of the dynamic models, and persisting the dynamic models to file modules.

15. The apparatus according to claim 11, wherein at least one of the selecting, receiving, separating, combining, evaluating, and providing is provided on an existing lead-sourcing infrastructure.

* * * * *